United States Patent [19]
Barrett et al.

[11] Patent Number: 5,257,274
[45] Date of Patent: Oct. 26, 1993

[54] HIGH POWER LASER EMPLOYING FIBER OPTIC DELIVERY MEANS

[75] Inventors: Joseph J. Barrett, Morris Plains; Jerry W. Kuper, Martinsville; Timothy C.-K. Chin, Lebanon, all of N.J.; Paul Papanestor, Milford, Pa.

[73] Assignee: AlliedSignal Inc., Morristownship, Morris County, N.J.

[21] Appl. No.: 818,934

[22] Filed: Jan. 10, 1992

Related U.S. Application Data

[63] Continuation-in-part of Ser. No. 698,047, May 10, 1991, abandoned.

[51] Int. Cl.$^5$ ............................................. H01S 3/10
[52] U.S. Cl. ................................. 372/20; 372/21; 372/22; 372/10; 372/29; 372/32; 372/6
[58] Field of Search ................................ 372/20-22, 372/10, 13, 29, 32, 30, 6

[56] References Cited

U.S. PATENT DOCUMENTS

| | | | |
|---|---|---|---|
| 4,617,666 | 10/1986 | Liu | 372/22 |
| 4,618,957 | 10/1986 | Liu | 372/22 |
| 4,637,026 | 1/1987 | Liu | 372/21 |
| 4,887,270 | 12/1989 | Austin | 372/22 |
| 4,907,235 | 3/1990 | Kuizenga | 372/21 |
| 5,025,446 | 6/1991 | Kuizenga | 372/22 |

OTHER PUBLICATIONS

Murray et al., Pulse Lengthening Via Overcoupled Internal Second Harmonic Generation, Journal Appl. Phys, vol. 41, No. 2, Feb. 1970, pp. 609-613.

M. L. Shand et al., "Temperature Dependence of the Excited-State Absorption of Alexandrite", IEEE J. Quantum Elect., QR-19, No. 3, Mar. (1983).

W. Koechner, "Solid State Laser Engineering", Springer-Verlag, New York p. 66 (1976).

Young et al., "Q-Switched Laser with Controllable Pulse Length", Appl. Phys. Lett. 18, pp. 129-130 Feb. (1971).

Lovberg et al., "Pulse Stretching and Shape Control by Compound Feedback in a Q-Switched Ruby Laser", J. Quantum Elect., QE-11, pp. 17-21 Jan. (1975).

Hordvik, "Pulse Stretching Utilizing Two-Photon Induced Light Absorption", J. Quantum Elect. QE-6, pp. 199-203 Apr. (1970).

Primary Examiner—Georgia Y. Epps
Attorney, Agent, or Firm—Gerhard H. Fuchs; Richard C. Stewart

[57] ABSTRACT

In a frequency-shifted, low gain pulsed tunable laser, spatial and temporal build-up of regions of high intensity in the fundamental frequency is minimized by generating a frequency-narrowed fundamental wavelength, preferentially frequency shifting high energy portions of the fundamental wavelength, and separating the frequency-shifted portion. The remaining fundamental frequency can safely be coupled into a a fiber optic delivery means.

13 Claims, 7 Drawing Sheets

HIGH POWER LASER EMPLOYING FIBER OPTIC DELIVERY MEANS

CROSS-REFERENCE TO RELATED APPLICATION

This application is a continuation-in-part to our commonly assigned co-pending U.S. application Ser. No. 698,047 filed 10 May 1991, now abandoned.

FIELD OF THE INVENTION

This invention provides laser apparatus having high power, pulsed output wherein temporal and spatial power peaks are minimized, so that the output beam is suitable for coupling into fiber optic means while avoiding damage to the fiber optics and/or to the optical resonator. The apparatus is particularly suited for applications where flexibility in the beam delivery means is desired, such as in medical applications.

BACKGROUND OF THE INVENTION

Low gain tunable solid state laser media, when operated in the pulsed mode (especially when operated in the Q-switched pulsed mode) under conditions of high peak power and high energy have a tendency to develop "hot spots" in the spatial beam profile. "Hot spots" are localized areas of energy concentration in the cross-section of the beam, so that the beam lacks spatial uniformity. Furthermore, the beam generated under these conditions will also be afflicted with temporal power peaks, sometimes referred to as "spikes". These spatial and temporal power peaks tend to cause optical damage to the input end of fiber optic delivery means into which one may wish to couple the beam.

The present invention has as its object the provision of a more uniform spatial beam profile in high power operation of a tunable low gain solid state laser, to make the beam suitable for coupling into a fiber optic beam delivery means under avoidance of damage to the fiber optic. A further object is the provision of such a beam having a more uniform spatial beam profile while at the same time minimizing temporal energy peaks.

SUMMARY OF THE INVENTION

These and other objects of the invention are achieved by the provision of a high power, pulsed solid-state laser apparatus comprising, in combination:

(a) a low gain tunable laser medium;

(b) means for exciting the laser medium to emit coherent radiation at a fundamental wavelength;

(c) reflecting means associated with the laser medium defining a resonant laser cavity for supporting coherent oscillation within the laser medium, the reflecting means comprising at least one output coupler;

(d) means for narrowing the frequency distribution of the coherent radiation emitted by the exited laser medium;

(e) non-linear frequency conversion means located within the resonant laser cavity, for transforming a portion of the coherent oscillation generated and supported within the laser cavity from its frequency-narrowed fundamental wavelength to a frequency-shifted derivative thereof, to generate a mixed wavelength laser beam;

(f) fiber optic means for delivering the mixed wavelength laser beam to a point of use; and (g) means associated with the output coupler for coupling the mixed wavelength laser beam generated within the resonant laser cavity into the fiber optic means; wherein the output coupler has a higher degree o reflectivity for the fundamental wavelength than for the frequency-shifted wavelength, so that the frequency-shifted wavelength is preferentially emitted from the resonant laser cavity, whereby, in operation, the spatial and temporal build-up of regions of high intensity of the fundamental wavelength is minimized.

The present invention further provides a method for generating a pulsed, mixed wavelength laser beam of a fundamental wavelength and a frequency-shifted derivative thereof, and delivering it to a point of use, while avoiding or minimizing spatial and temporal build-up of regions of high intensity of the fundamental wavelength, which comprises, in combination:

(a) generating pulsed, coherent oscillations of a frequency-narrowed fundamental wavelength within a resonant laser cavity by exciting a low gain laser medium located within the laser cavity;

(b) subjecting the coherent oscillations of the frequency-narrowed fundamental wavelength within the resonant laser cavity to the action of non-linear frequency conversion means, to preferentially frequency-shift peak power portions of the fundamental wavelength;

(c) preferentially extracting the frequency-shifted portion of the coherent oscillations from the resonant laser cavity, while recycling the fundamental wavelength portion, to thereby generate and extract a mixed wavelength laser beam from said resonant laser cavity, and (d) coupling the mixed wavelength laser beam into fiber optic beam delivery means, and delivering the beam to a point of use.

Of course, it is also possible to separate the frequency-shifted derivative from the mixed frequency beam, by suitable filtering means, as for example by use of a dichroic mirror which is fully reflective for the fundamental frequency and non- or partially reflective for the frequency-shifted derivative, and then coupling the fundamental frequency into the fiber optic delivery means. Under these conditions, the fundamental frequency beam will enjoy all of the the benefits of uniformity of spatial and temporal beam profile.

For purposes of the present invention, a "low gain laser medium" is a laser medium having a stimulated emission cross-section ($\sigma_e$) less than $1 \times 10^{-19}$ cm$^2$. A "high power" laser apparatus is a solid state laser operating at a pulse energy of at least 1 mJ, at a pulse duration of from about 50 ns to about 100 μs, at a peak power of at least 10 W (peak power being defined as the pulse energy divided by the pulse duration at the full width at half maximum points).

BRIEF DESCRIPTION OF THE DRAWINGS

The invention may be better understood with reference to the annexed drawings, wherein.

DETAILED DESCRIPTION OF THE INVENTION

Figure 1:
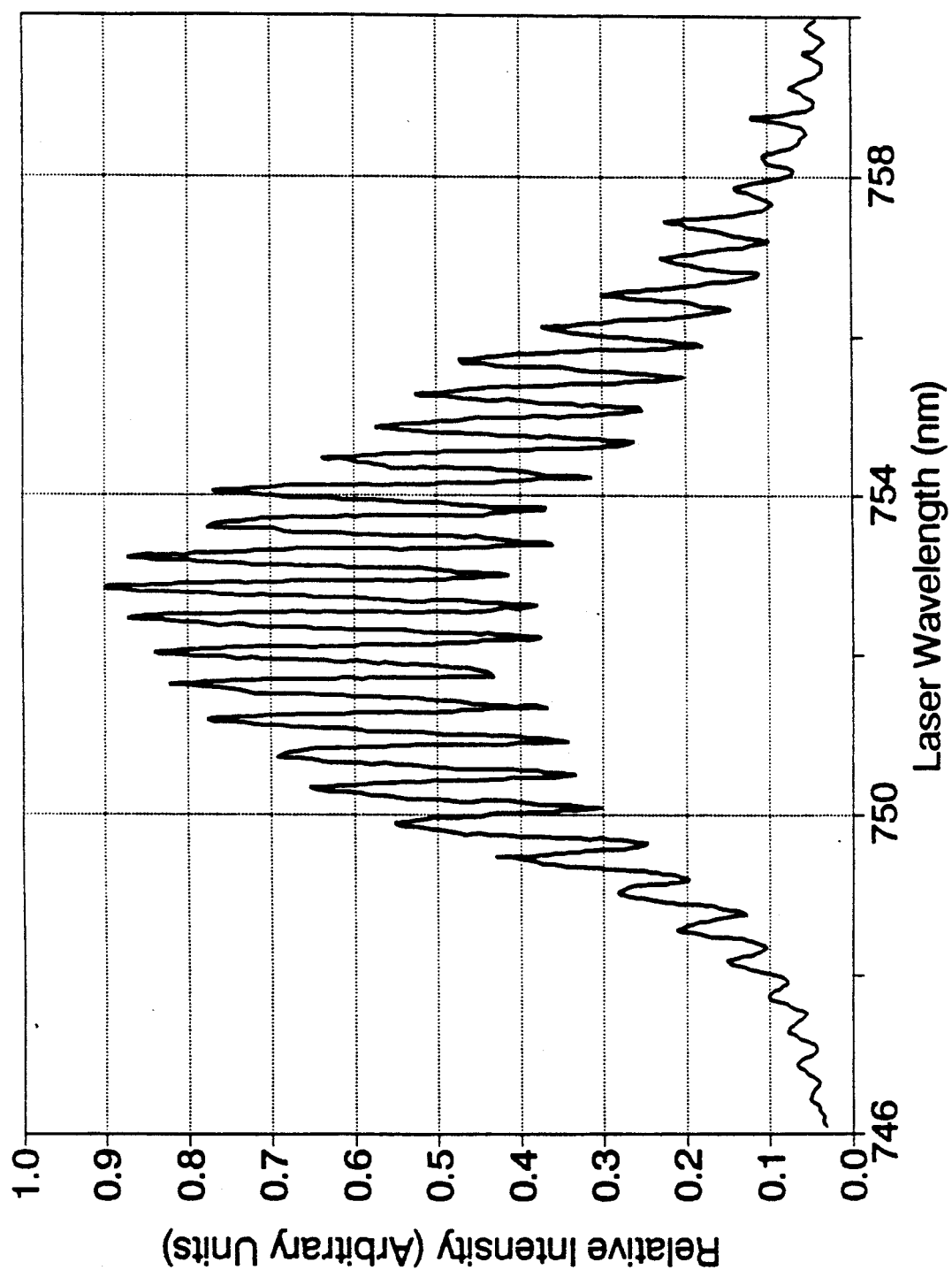
FIG. 1 is a graph showing the frequency/intensity distribution of the coherent radiation emitted from an excited alexandrite laser (a typical tunable low gain laser) in the Q-switched mode.

The following is a detailed description of the invention, of the preferred embodiments and of the best mode contemplated for its practice.

The rate at which stored energy is extracted from a laser rod during pulsed operation, including Q-switched operation, is governed by the gain of the laser medium. The single pass gain coefficient for a solid state laser medium is proportional to the product of the inverted population density of the active laser ions and the stimulated emission cross-section (neglecting, for the sake of simplicity, the contributions of ground and excited state absorption on the gain coefficient). The inverted population density depends on the pumping level (usually the flashlamp pumping level). The reported stimulated emission cross-section for alexandrite (a typical low gain laser host) is about $3 \times 10^{-20} cm^2$ for a laser medium temperature of 200° C. see M. L. Shand and H. P. Jenssen, IEEE J. Quantum Elect. QE-19, 480 (1983). The stimulated emission cross-section for Nd:YAG (a typical high gain laser host) is $8.8 \times 10^{-19} cm^2$ [see W. Koechner "Solid-State Laser Engineering" Springer Verlag, New York (1976) p. 66]. Assuming the same inverted population density for both alexandrite and Nd:YAG, then the gain coefficient for Nd:YAG is about 30 times larger than that of alexandrite.

In operation, the laser mode intensity builds up according to the equation $$I = I_o e^{+g_o l}$$

where $I_o$ is the initial mode intensity before amplification, $g_o$ is the gain coefficient and L is the gain length (typically the length of the pumped region of the laser rod). A typical Q-switched Nd:YAG laser with an output energy of about 100-200 mJ has a full width half maximum (FWHM) pulse duration of about 7-10 ns.

Assuming a laser resonator cavity length of one foot (about 30.5 cm), the time required for light to make one round trip traversal of the resonator is about 2 ns. In this case, 3 to 5 round trips are sufficient to extract the stored energy in the Nd:YAG laser rod. In alexandrite, on the other hand, a substantially larger number of passes is required to extract the stored energy, because of its lower gain, as evident from the stimulated emission cross-section data cited above. A typical Q-switched alexandrite laser pulse has a duration in the range of about 60-120 ns (FWHM), so that about 30 to about 60 round trips are needed to extract the stored laser energy. The large number of passes of the laser wavefront through the laser rod in the case of alexandrite produces non-uniformities in the spatial profile which are not present in Nd:YAG lasers. The effect of small, unavoidable imperfections in the optical quality of the alexandrite rod becomes magnified as the laser beam makes many passes through the rod, undergoing amplification on each pass. Also, unavoidable non-uniformity of pumping of the rod (as by a flashlamp), will produce regions of higher and lower gain in the laser rod. Many passes of the laser beam through the unevenly pumped laser rod will result in a distorted spatial beam profile, which progressively deteriorates after each pass.

In order to smooth the spatial profile of the laser pulse generated in a low gain laser medium, such as that generated in an alexandrite laser medium, an intracavity non-linear frequency conversion means is introduced into the laser cavity, to selectively transform energy in high intensity regions to a frequency-shifted derivative thereof, and then preferentially extracting the frequency shifted wavelength through an output coupler having relatively higher transparency for the frequency shifted wavelength, while permitting the fundamental intensity to build up under substantial avoidance of spatial and temporal "hot spots".

As to the "non-linear frequency conversion means", the passage of a high power laser beam through a material will induce a non-linear response of the polarization of the material caused by the electric field of the laser beam. The degree of non-linear response is governed by the magnitude of the non-linear susceptibility of the material. The effect of this non-linear response is to shift the frequency of the fundamental laser beam to other frequencies. Examples of non-linear frequency conversion means include:

second harmonic generation;
sum and difference frequency generation;
third and higher harmonic generation;
stimulated Raman shifting (Stokes and anti-Stokes);
optical parametric oscillation; and others. Any one or a combination of these will be suitable for use in the present invention. For the sake of convenience, second harmonic generation is a preferred means, and typically the non-linear frequency conversion means will be represented by a second harmonic generating (SHG) crystal. Examples of second harmonic generating crystals suitable for use in the present invention, and especially for use with alexandrite laser media, include:

KDP (potassium dihydrogen phosphate);
KD*P (potassium dideuterium phosphate);
ADP (ammonium dihydrogen phosphate);
KTP (potassium titanium oxide phosphate);
RDP (rubidium dihydrogen phosphate);
RDA (rubidium dihydrogen arsenate);

CDA (cesium dihydrogen arsenate);
CD*A (cesium dideuterium arsenate);
LiIO$_3$ (lithium iodate);
KNbO$_3$ (potassium niobate);
LiNbO$_3$ (lithium niobate);
Ba$_2$NaNb$_5$O$_{15}$ (barium sodium niobate);
β-BaB$_2$O$_4$ (BBO: beta-barium borate);
LiB$_3$O$_5$ (LBO: lithium triborate), and the like.

The effect of the non-linear frequency conversion means as employed in the present invention is in the following description throughout exemplified with reference to an SHG crystal; any other of the above-described non-linear frequency conversion means is suitable and will act in like or similar manner.

Numerical values for harmonic generation parameters for some of these second harmonic generating crystals are shown in Table I, below:

TABLE I

| Parameter | SHG Crystal | | | |
|---|---|---|---|---|
| | KD*P | BBO | LBO | KTP |
| Refractive Index at 633 nm | 1.507 | 1.667 | 1.574 | 1.74 |
| Non-Linear Coeff. (pm/V) | $d_{36} = 0.53$ | $d_{22} = 2.3$ | $d_{31} = 1.05$ | $d_{24} = 7.6$ |
| Angular Acceptance (mrad-cm) | 2.0 | 1.4 | 2.2 | 15 |
| Spectral Acceptance (nm-cm) | 3.2 | 0.7 | 0.6 | 0.56 |
| Temperature Acceptance (°C.-cm) | 6.7 | 55 | 3.18 | 25 |

The second harmonic conversion efficiency is governed by the equation $$\frac{P_{2\omega}}{P_\omega} = K \frac{l^2 d_{eff}^2 P_\omega}{A}$$

where I is the length of the nonlinear crystal, $d_{eff}$ is the nonlinear coefficient, $P_\omega$ is the power at the fundamental wavelength, A is the cross-sectional area of the fundamental beam in the nonlinear crystal and K is a proportionality constant. If the lengths of the nonlinear crystals of Table I are adjusted to compensate for the different values of their nonlinear coefficients, then it is possible to achieve the same second harmonic conversion efficiency for each crystal. By way of numerical example, if the length of the KD*P crystal were selected at 3 cm, one can calculate the length of the other non-linear crystals shown in Table I in order to achieve a constant second harmonic conversion efficiency. The results are shown in Table II, below:

TABLE II

| Parameter | SHG Crystal | | | |
|---|---|---|---|---|
| | KD*P | BBO | LBO | KTP |
| Crystal length (cm) | 3.0 | 0.69 | 1.51 | 0.21 |
| Non-Linear Coeff. (pm/V) | $d_{36} = 0.53$ | $d_{22} = 2.3$ | $d_{31} = 1.05$ | $d_{24} = 7.6$ |
| Angular Acceptance (mrad) | 0.67 | 2.03 | 1.46 | 71.4 |
| Spectral Acceptance (nm) | 1.07 | 1.01 | 0.40 | 2.67 |
| Temperature Acceptance (°C.) | 2.23 | 79.7 | 2.1 | 119.1 |

The angular and spectral acceptance values shown in Table II are the maximum values for these particular conditions. The actual values must be less than those of Table II in order to have sufficient SHG conversion efficiencies.

The intracavity SHG crystal (non-linear frequency conversion means) will selectively convert the high intensity regions to second harmonic output. The overall effect of the SHG crystal is to act as a power limiter at the fundamental laser wavelength. The conversion efficiency of wavelength shifting, (here second harmonic generation) varies with the square of the laser intensity. Regions of high intensity in the laser cavity will be converted more efficiently to the second harmonic than regions of low intensity. As a result, the high intensity regions never get a chance to build up to destructive levels. In operation, the SHG crystal (as well as the frequency distribution narrowing means) desirably is temperature controlled to prevent uncontrolled heat build-up and resultant operational instability. Such temperature control is conventional. The shifted frequency (here second harmonic) is readily and preferentially extracted from the laser cavity by means of an output coupler having relatively higher transparency for the shifted frequency (here second harmonic), and higher reflectivity for the fundamental frequency. Such output couplers are commercially available, for any desired degree of transparency and reflectivity at any wavelength here under contemplation.

Optical damage typically occurs for power densities above about 0.25 to 1 GW/cm$^2$. When coupling the laser output into a fiber optic, peak power output densities must be maintained below the optical damage threshold level to insure safe coupling. This can be achieved by means of the present invention, which permits high power operation under avoidance of trespass into forbidden peak power regions. In a typical example, involving a high power alexandrite laser with a 100 mJ pulse to be coupled into a 1,000 μm diameter optical fiber (a typical optical fiber diameter). The laser beam would be focused to an 800 μm diameter spot to insure that the beam does not couple into the fiber optic cladding. The area of this 800 μm diameter spot is $5 \times 10^{-3}$ cm$^2$. Assuming the alexandrite pulse duration to be 100 ns, and the laser power is 1 MW and, assuming complete uniformity of the spatial profile of the laser beam, the power density at the input surface of the fiber optic would be 200 MW/cm$^2$. This power density will allow safe coupling of the laser output into the fiber optic. However, if there are regions of higher intensity in the laser spatial profile, then there is potential for damaging the fiber input face. The present invention is aimed at elimination or amelioration of regions of higher power intensity in the laser beam spatial profile.

As previously stated, for purposes of the present invention, a "low gain laser medium" is a laser medium having a stimulated emission cross-section ($\sigma_e$) less than $1 \times 10^{-19}$ cm$^2$. Stimulated emission cross-sections for exemplary laser materials are listed below:

| | Cross-Section $\sigma_e$ (cm$^2$) |
|---|---|
| High Gain Materials | |
| Nd:YAG | $8.8 \times 10^{-19}$ |
| Nd:BEL | $(2-4) \times 10^{-19}$ |
| Nd:GSGG | $3.1 \times 10^{-19}$ |
| Ti:Al$_2$O$_3$ | $3.5 \times 10^{-19}$ |
| Low Gain Materials | |
| Cr:BeAl$_2$O$_4$ (alexandrite) | $(1-3) \times 10^{-20}$ |
| Cr:LiSAF | $5 \times 10^{-20}$ |
| Nd:Glass | $3 \times 10^{-20}$ |

| | Cross-Section $\sigma_e$ (cm$^2$) |
|---|---|
| Cr:LiCAF | $1.3 \times 10^{-20}$ |

The single pass gain coefficient for a solid-state laser rod is proportional to the product of the inverted population density of the active laser ions and the stimulated emission cross-section ($\sigma_e$) The stimulated emission cross-section is a property of the laser material whereas the inverted population density varies with the experimental conditions (flashlamp excitation level, active ion concentration, optical pumping geometry, etc.). Therefore, it is most convenient to use the stimulated emission cross-section as a measure of the intrinsic gain of the laser material, as is done here. Exemplary suitable low gain laser media are Cr:BeAl$_2$O$_4$ (alexandrite), Cr:LiSAF, Nd:Glass and Cr:LiCAF, with Cr:BeAl$_2$O$_4$ (alexandrite), Cr:LiSAF and Cr:LiCAF being preferred, with Cr:BeAl$_2$O$_4$ (alexandrite) and Cr:LiCAF being more preferred, and Cr:BeAl$_2$O$_4$ (alexandrite) being most preferred.

Figure 2:
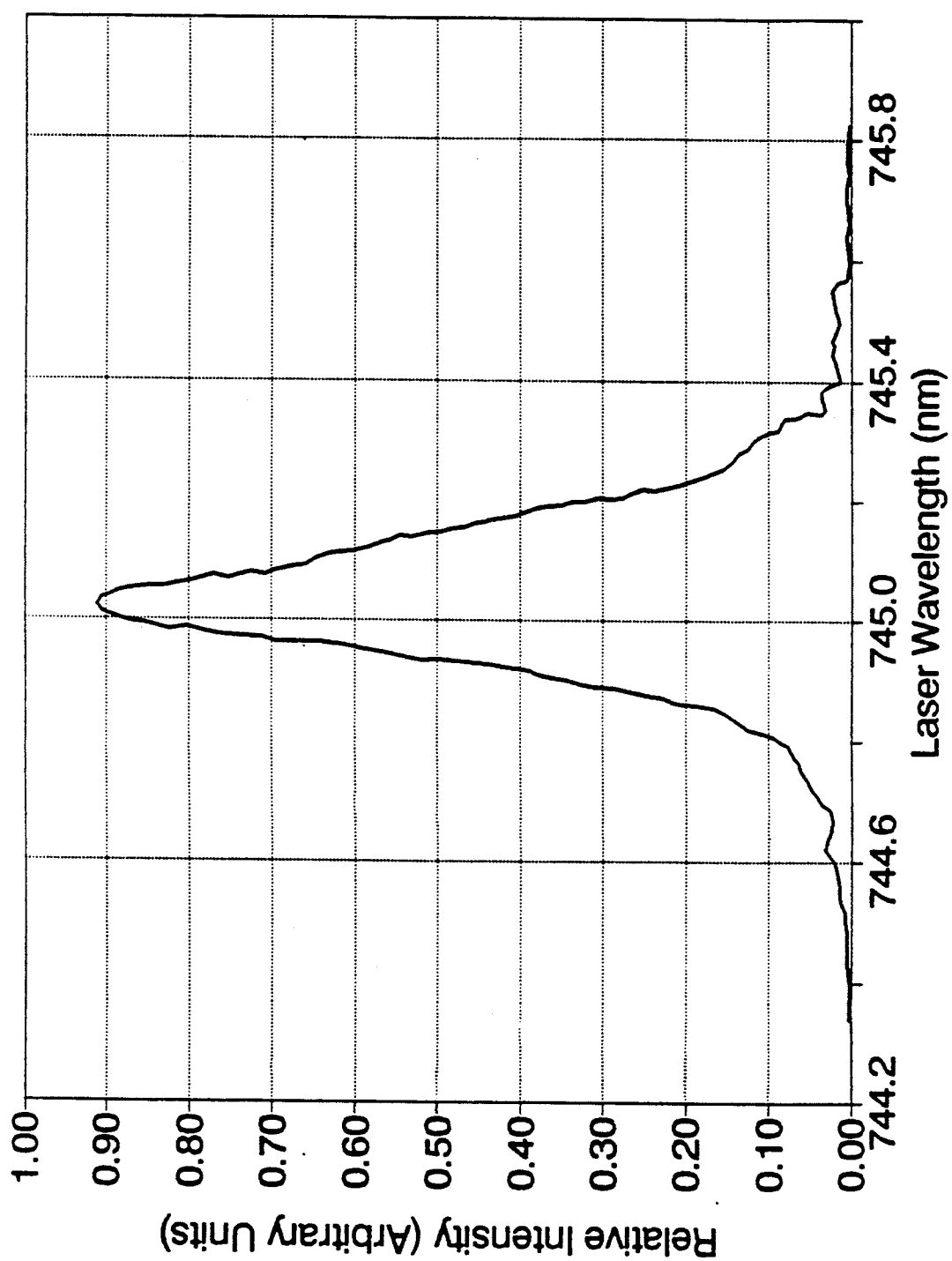
FIG. 2 is a graph showing the frequency/intensity distribution of typical frequency narrowed coherent radiation emitted from a tuned excited alexandrite laser in the Q-switched mode.

These low gain laser materials have tuning ranges that vary from a few nanometers to more than a hundred nanometers. For example, the laser tuning range of alexandrite is in the spectral region from 701 nm to 858 nm. If an alexandrite laser is operated without any spectral tuning element in the laser cavity, the output will cover a spectral band of about 10 nm, depending on experimental conditions. Experimental results of the spectral output of a Q-switched alexandrite laser operated without any special line narrowing elements are shown in FIG. 1. The observed intensity modulation is due to the birefringence of the laser rod. In order to efficiently generate the second harmonic for such a broad laser band, it is necessary to narrow the frequency distribution by appropriate means, e.g. by providing tuning elements within the laser cavity. Other means for frequency narrowing are available, such as seeding with a line narrowed laser source. Experimental results of the spectral output of a tuned Q-switched alexandrite laser (by means of 4-plate birefringent tuner) are shown in FIG. 2. The output covers a spectral band of about 0.5 nm, which amounts to an about 20-fold reduction of the line width vs. the same laser operated without any special line narrowing elements (see FIG. 1).

Tuning elements such as birefringent tuners (BRT), Fabry-Perot etalons, diffraction gratings, prisms, resonant reflectors and the like, or combinations of such tuning elements may be used to narrow the lasing wavelength distribution. With reference to Table II, the laser bandwith must be less than the spectral acceptance in order to obtain acceptably efficient SHG conversion. Therefore, for the low gain laser materials employed in the present invention, means for narrowing the spectral output of the laser must be employed to limit the laser bandwidth to less than the particular spectral acceptance value for the SHG crystal employed. Hence, means for narrowing the spectral output of the fundamental frequency are critically required for the apparatus of the present invention.

Figure 3:
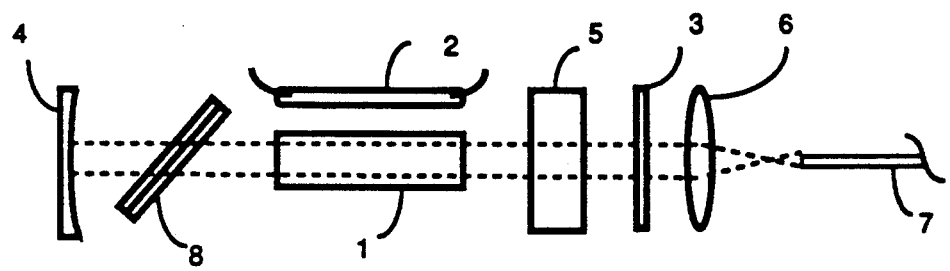
FIG. 3 is a schematic diagram of an apparatus of the present invention.

With reference to FIG. 3, the laser apparatus comprises a low gain solid-state laser rod 1 (such as an alexandrite rod) within a laser cavity defined by high reflecting mirror 4 and output coupler 3. Flashlamp 2 associated with laser rod 1 serves to generate stimulated emission within the rod 1. The laser cavity further contain a second harmonic generating (SHG) crystal 5. Laser output from output coupler 3 is coupled into fiberoptic 7 be means of focusing lens 6. The laser cavity further contains a birefingent tuner 8, for line width narrowing. Output coupler 3 has a high degree of transparency for the second harmonic, but is partially reflective for the fundamental frequency.

In operation, flashlamp 2 generates stimulated emission at a fundamental frequency in laser rod 1, which resonates within the laser cavity defined by high reflector 4 and output coupler 3. The fundamental frequency resonates and builds in intensity within the laser cavity. High intensity portions of the fundamental frequency are preferably shifted to the second harmonic within SHG crystal 5, and the shifted frequency is preferentially coupled out of the laser cavity through output coupler 3, which is highly transmissive at this frequency. The fundamental frequency and/or the shifted frequency laser output passing through output coupler 3 is focused into fiber optic 7 by means of focusing lens 6. Other means for coupling the output from output coupler 3 into fiber optic 7, such as focusing prisms or mirrors, may be substituted for lens 6. To maintain stable operation, SHG crystal 5 and birefringent tuner 8 are preferably temperature controlled (by means not shown).

Figure 4:
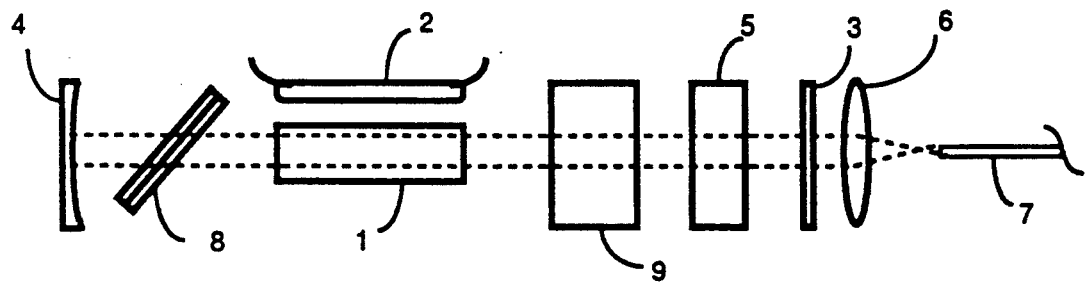
FIG. 4 is a schematic diagram of an alternate embodiment of an apparatus of the present invention employing a Q-switch.

The apparatus of FIG. 4 and its operation are the same as described with reference to FIG. 1, (with like reference numerals referring to like parts), except for introduction of Q-switch 9 (Pockels cell, acousto-optic Q-switch or the like) into the laser cavity. Q-switch 9 serves to shorten the pulse, with concomitant increase in its intensity and resultant improvement in the efficiency of the second harmonic generation. This improvement in frequency-shifting efficiency enhances the smoothing of spatial and temporal peaks in the laser output. For this reason, apparatus employing a Q-switch represents a preferred embodiment of the present invention. Examples of different types of Q-switches (all suitable for purposes of the present inventions) include electro-optical (Pockels cell), acousto-optical, dye cell, rotating prism, and the like.

Figure 5:
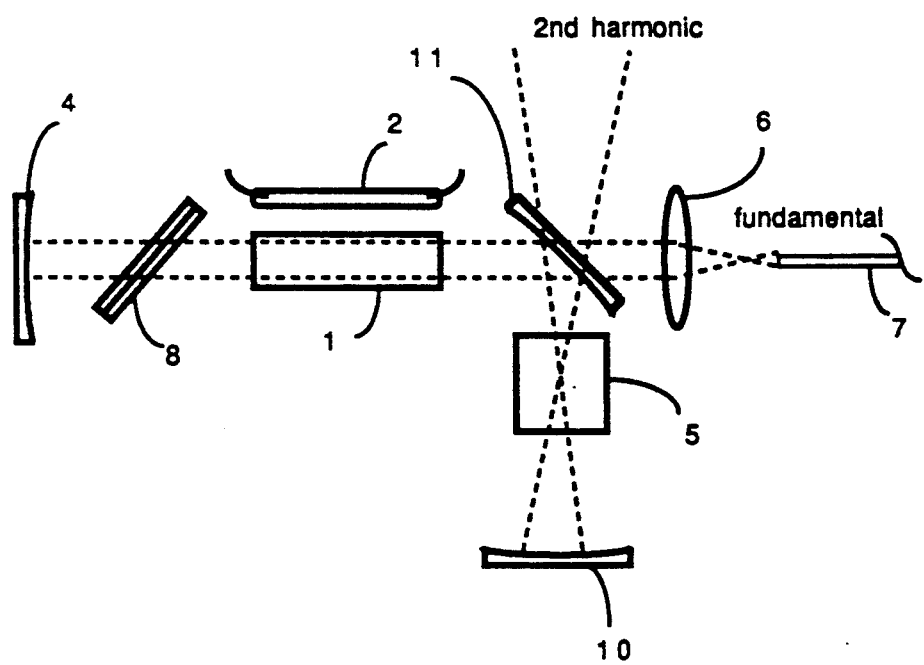
FIG. 5 is a schematic diagram of an apparatus without a Q-switch, wherein the fundamental frequency is focussed into a second harmonic generating crystal, and wherein fundamental and frequency-shifted wavelength are separately outcoupled.

FIG. 5 illustrates an embodiment wherein fundamental and second harmonic frequencies are outcoupled separately. In this embodiment, high efficiency second harmonic generation can be obtained without Q-switching, at relatively longer pulse duration. In this embodiment, the lasing cavity is defined by reflectors 4, 10 and 11. Of these, 4 is a high reflector at the fundamental frequency and 10 is a high reflector at both the fundamental and the second harmonic frequencies; 11 is a partial reflector at the fundamental frequency (about 75-95% reflectance), but is highly transmissive at the second harmonic. The initial output from the low gain laser rod 1 resulting from excitation by flashlamp 2 is frequency narrowed by means of birefringent tuner 8 and deflected and focused by partial reflector 11 through SHG crystal 5, to be reflected back through SHG crystal 5. Second harmonics generated in SHG crystal 5 are preferentially outcoupled through partial reflector 11 on the return pass. Fundamental frequencies continue to resonate and are outcoupled through partial reflector 11, for coupling into fiber optic 7 by means of focusing lens 6. The intra-cavity SHG crystal efficiently generates the second harmonic and limits the formation of high intensity spatial and temporal spikes at the frequency narrowed fundamental wavelength under the conditions of high power operation, as herein defined. To maintain stable operation, SHG crystal 5 and birefringent tuner 8 are preferably temperature controlled (by means not shown). In the arrangement of FIG. 5, the fundamental frequency is focussed into the SHG crystal, to thereby achieve the concentrated power density of the fundamental in the SHG crystal as is produced with the unfocussed, Q-switched configuration of FIG. 4.

Figure 6:
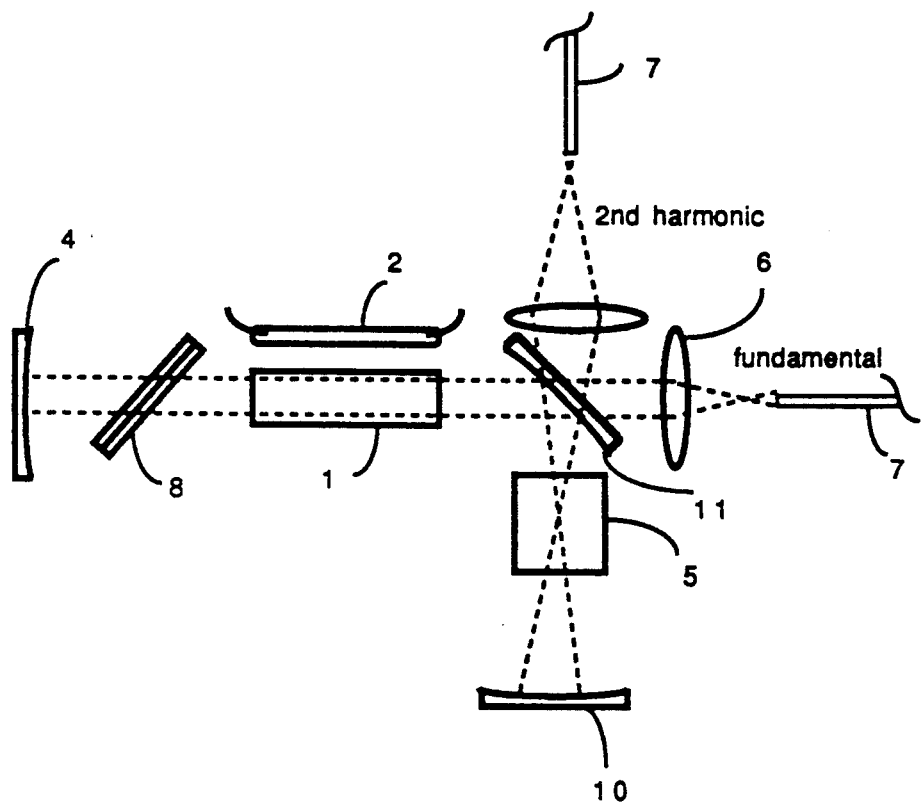
FIG. 6 depicts the apparatus of FIG. 5, with additional provisions for coupling the second harmonic into an optical fiber.

FIG. 6 illustrates a modification of the apparatus of FIG. 5, which involves provision of a second focussing lens 12 which focusses the beam containing the predominant portion of the second harmonic into a separate fiberoptic 13.

Figure 7:
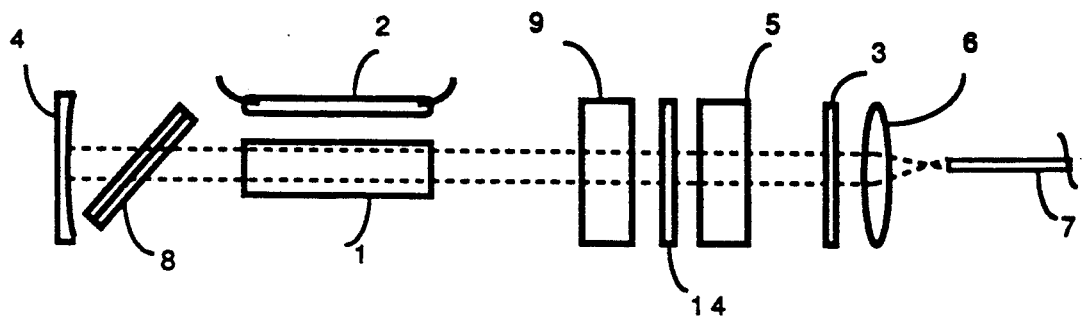
FIG. 7 is a schematic diagram of an embodiment of the present invention employing a Q-switch and utilizing for frequency-narrowing a birefringent tuner in combination with an etalon.

FIG. 7 illustrates an alternate frequency narrowing technique, employing an etalon 14 in combination with birefringent tuner 8. A resonant reflector may be substituted for etalon 14 [see W. Koechner, Solid State Laser Engineering, Springer Verlag, New York, 1976 pp. 209-211]to serve as frequency narrowing means in combination with a birefringent tuner.

Figure 8:
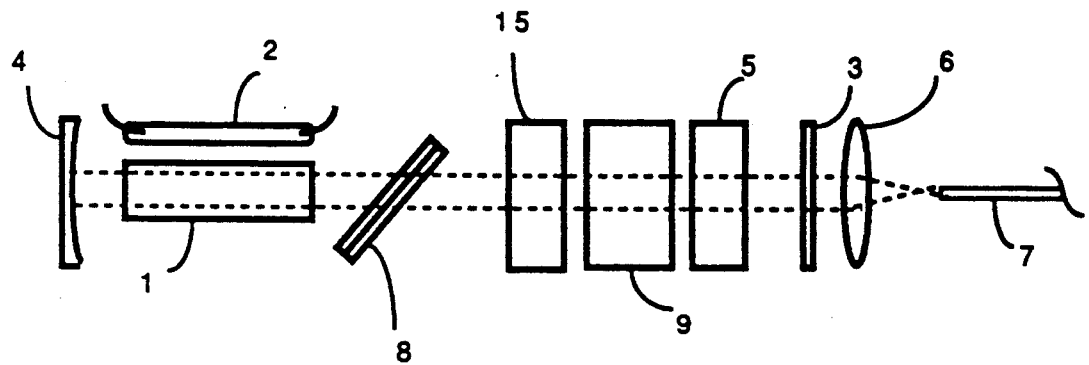
FIG. 8 is a schematic diagram of an embodiment of the present invention employing a Q-switch and utilizing for frequency-narrowing a birefringent tuner, further utilizing polarization isolation means (e.g. Brewster plates or polarizer) to prevent or minimize bandwidth broadening that could otherwise result from interaction between the birefringent tuner and the second harmonic generating crystal.

Birefringent tuners and SHG crystals are birefringent optical elements that can interact, with resultant bandwidth broadening, thereby negating the smoothing effect of the SHG crystal by placing the spectral output of the laser rod beyond the acceptance bandwidth of the SHG crystal. FIG. 8 illustrates an arrangement which avoids birefringent tuner/SHG crystal interaction by including a polarization isolating device 15 (suitably a Brewster plate or a polarizer) between the birefringent tuner 8 and the SHG crystal 5. In a preferred embodiment illustrated by FIG. 4 using an alexandrite laser rod, interposition of a polarization isolating device 15 is not required since the alexandrite laser rod, which is naturally birefringent, is a polarizing element and thus serves as the polarization isolating device. If, on the other hand, laser rod 1 is an unpolarized laser crystal such as Nd:Glass, a suitable isolating device should be included.

Figure 9:
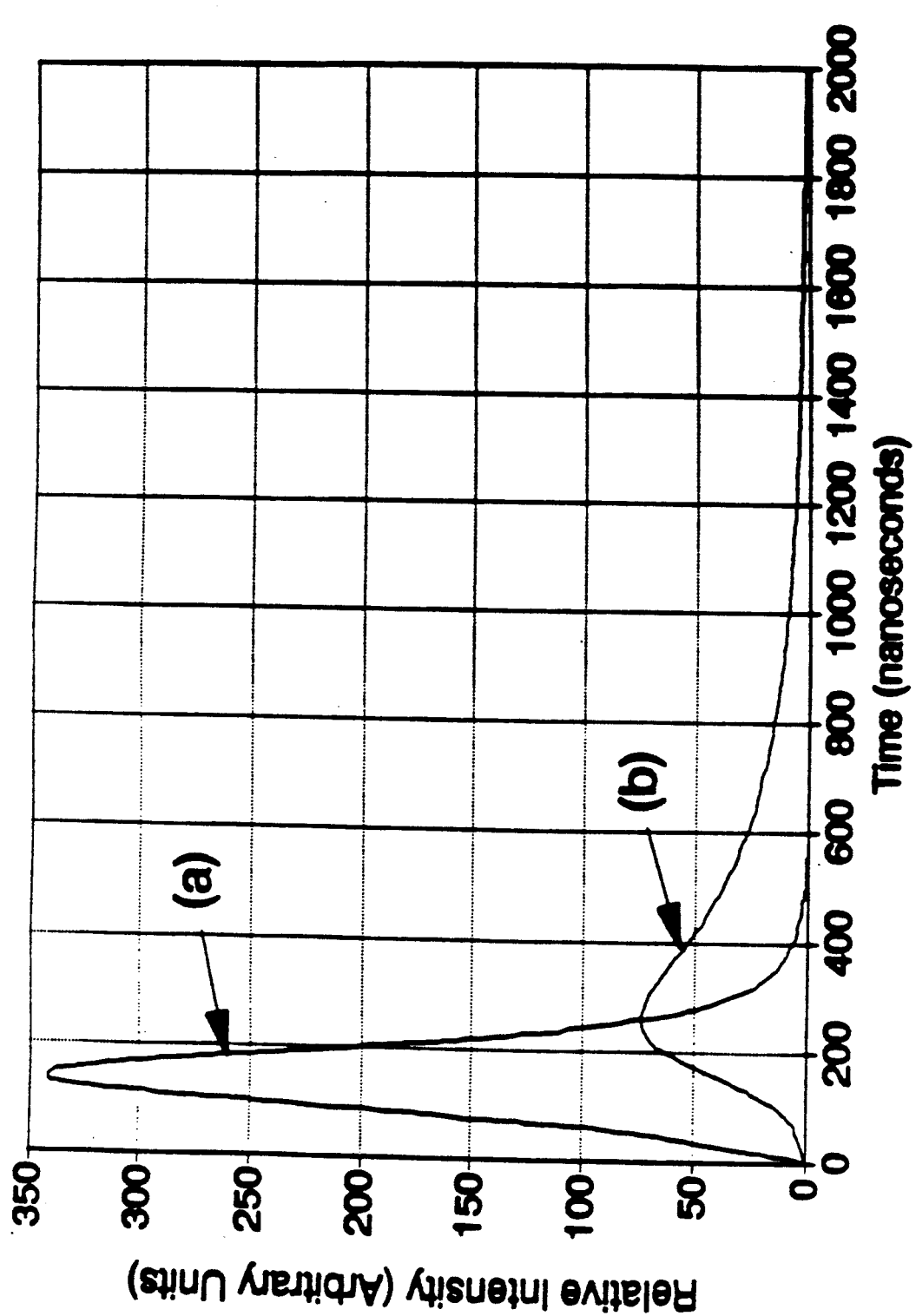
FIG. 9 is a graph illustrating comparative temporal output (relative intensity vs. time) of the fundamental wavelength of an alexandrite laser operating in the high power mode with a laser pulse energy of 55 mJ wherein curve (a) shows operation without the benefit of the present invention, and curve (b) shows operation within the scope of the present invention, but under otherwise comparable conditions.

The benefits of of this invention are illustrated in FIG. 9, wherein curve (a) shows the relative intensity vs. time of an alexandrite laser without the line narrowing/frequency shifting herein described, and curve (b) shows the same for an alexandrite laser operated under comparable conditions but with the benefit of the present invention. Curve (b) shows an about 4-fold reduction of peak intensity, and an about 3-fold broadening of the output curve. The output illustrated by curve (a) poses damage problems when coupled into fiberoptics, which are avoided by the output illustrated by curve (b).

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. A high power, pulsed solid state laser apparatus comprising, in combination:
   (a) a low gain tunable laser medium;
   (b) means for exciting said laser medium to emit coherent radiation at a fundamental wavelength;
   (c) reflecting means associated with said laser medium defining a resonant laser cavity for supporting coherent oscillation within said laser medium, said reflecting means comprising at least one output coupling means;
   (d) means for narrowing the frequency distribution of the coherent radiation emitted by the excited laser medium;
   (e) non-linear frequency conversion means within said resonant laser cavity, for transforming a portion of the coherent oscillation generated and supported within said laser cavity from its fundamental wavelength to a frequency-shifted derivative thereof, to generate a mixed wavelength laser beam;
   (f) fiber optic means for delivering said mixed wavelength laser beam to a point of use; and
   (g) means associated with said output coupling means for coupling said mixed wavelength laser beam generated within said resonant laser cavity into said fiber optic means;
   wherein said output coupling means has a higher degree of reflectivity for said fundamental wavelength than for said frequency-shifted wavelength, so that the frequency-shifted wavelength is preferentially emitted from said resonant laser cavity, whereby, in operation, the spatial and temporal build-up of regions of high intensity of said fundamental wavelength is minimized.

2. The apparatus of claim 1, wherein said low gain laser medium is selected from the group consisting of alexandrite, Cr:LiSAF, Nd:glass and Cr:LiCAF.

3. The apparatus of claims 1 or 2, further comprising a Q-switch within said resonant laser cavity.

4. The apparatus of claims 1 or 2, wherein said non-linear frequency conversion means is a second harmonic generating crystal.

5. The apparatus of claims 1 or 2, further comprising temperature control means for the means for narrowing the frequency distribution and the non-linear frequency conversion means.

6. A high power, pulsed solid state laser apparatus comprising, in combination:
   (a) a low gain tunable laser medium;
   (b) means for exciting said laser medium to emit coherent radiation at a fundamental wavelength;
   (c) reflecting means associated with said laser medium defining a resonant laser cavity for supporting coherent oscillation within said laser medium, said reflecting means comprising at least one output coupling means;
   (d) means for narrowing the frequency distribution of the coherent radiation emitted by the excited laser medium;
   (e) non-linear frequency conversion means located within said resonant laser cavity, for transforming a portion of the coherent oscillation generated and supported within said laser cavity from its fundamental wavelength to a frequency-shifted derivative thereof;
   (f) fiber optic means for delivering said fundamental wavelength coherent oscillation to a point of use; and
   (g) means associated with said output coupling mean for coupling said fundamental wavelength coherent oscillation generated within said resonant laser cavity into said fiber optic means;
   wherein said output coupling means has a higher degree of reflectivity for said fundamental wavelength than for said frequency-shifted wavelength, so that the frequency-shifted wavelength is preferentially emitted from said resonant laser cavity, whereby, in operation, the spatial and temporal build-up of regions of high intensity of said fundamental wavelength is minimized.

7. The apparatus of claim 6, wherein said low gain laser medium is selected from the group consisting of alexandrite, Cr:LiSAF, Nd:glass and Cr:LiCAF.

8. The apparatus of claims 6 or 7, further comprising a Q-switch within said resonant laser cavity.

9. The apparatus of claims 6 or 7, wherein said non-linear frequency conversion means is a second harmonic generating crystal.

10. The apparatus of claims 6 or 7, further comprising temperature control means for the means for narrowing the frequency distribution and the second harmonic generating crystal.

11. The apparatus of claims 6 or 7, wherein said non-linear frequency conversion means is a second harmonic generating crystal, and wherein one of said reflecting means is a highly reflecting focussing mirror which is arranged to focus the fundamental frequency into said second harmonic generating crystal.

12. A method for generating pulsed laser radiation of a fundamental wavelength and a frequency-shifted derivative thereof, and delivering at least the fundamental wavelength radiation to a point of use, while minimizing spatial and temporal build-up of regions of high intensity of the fundamental wavelength, which comprises, in combination:

(a) generating pulsed, coherent oscillations of a frequency-narrowed fundamental wavelength within a resonant laser cavity by exciting a low gain tunable laser medium located within said laser cavity and subjecting said oscillations to means for narrowing frequency distribution;

(b) subjecting said coherent oscillations of frequency-narrowed fundamental wavelength within said resonant laser cavity to the action of non-linear frequency conversion means, to preferentially frequency-shift peak power portions of said fundamental wavelength;

(c) preferentially extracting the frequency-shifted portion of said coherent oscillations from said resonant laser cavity, while maintaining oscillation at said fundamental frequency, and (d) coupling at least the fundamental frequency portion of said coherent oscillations into fiber optic beam delivery means, for delivery to a point of use.

13. The method of claim 12, wherein said fundamental and frequency shifted portions of said pulsed laser radiation are both coupled together into said fiber optic beam delivery means.

* * * * *